(12) United States Patent
Talukder et al.

(10) Patent No.: US 7,026,922 B1
(45) Date of Patent: Apr. 11, 2006

(54) METHOD AND APPARATUS FOR AUTOMATICALLY IDENTIFYING THE LOCATION OF PRESSURE SENSORS IN A TIRE PRESSURE MONITORING SYSTEM

(75) Inventors: Monirul Huq Talukder, West Bloomfield, MI (US); Ronald Patrick Brombach, Plymouth Township, MI (US); Thomas Michael McQuade, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 10/064,691

(22) Filed: Aug. 7, 2002

(51) Int. Cl.
*B60C 23/02* (2006.01)

(52) U.S. Cl. ............... 340/442; 340/444; 340/447; 73/146

(58) Field of Classification Search .......... 340/442, 340/444, 447, 438, 539.1, 524, 309.16; 73/146, 73/146.2
See application file for complete search history.

(56) References Cited

U.S. PATENT DOCUMENTS

| | | |
|---|---|---|
| 1,948,427 A | 2/1934 | Moecker ............ 40/41 |
| 1,954,133 A | 4/1934 | Taylor ............ 196/58 |
| 2,274,557 A | 2/1942 | Morgan et al. ...... 177/351 |
| 2,578,358 A | 12/1951 | Jellison ............ 177/811 |
| 2,589,623 A | 3/1952 | Merritt et al. ....... 116/129 |
| 3,852,717 A | 12/1974 | Hosaka et al. ......... 340/58 |
| 3,911,855 A | 10/1975 | Haven ............ 116/114 |
| 3,965,847 A | 6/1976 | Deming ............ 116/114 |
| 3,974,477 A | 8/1976 | Hester ............ 340/58 |
| 4,051,803 A | 10/1977 | Arnone ............ 116/34 R |
| 4,316,176 A | 2/1982 | Gee et al. ............ 340/58 |
| 4,376,931 A | 3/1983 | Komatu et al. ......... 340/58 |
| 4,443,785 A | 4/1984 | Speranza ............ 340/58 |
| 4,494,106 A | 1/1985 | Smith et al. .......... 340/58 |
| 4,510,484 A | 4/1985 | Snyder ............ 340/58 |
| 4,574,267 A | 3/1986 | Jones ............ 340/58 |
| 4,742,476 A | 5/1988 | Schwartz et al. ....... 364/550 |
| 5,061,917 A | 10/1991 | Higgs et al. .......... 340/539 |
| 5,109,213 A | 4/1992 | Williams ............ 340/447 |
| 5,463,374 A | 10/1995 | Mendez et al. ........ 340/442 |
| 5,517,853 A | 5/1996 | Chamussy ............ 73/146.3 |
| 5,569,848 A | 10/1996 | Sharp ............ 73/146.2 |
| 5,583,482 A | 12/1996 | Chamussy et al. ...... 340/442 |
| 5,587,698 A | 12/1996 | Genna ............ 340/442 |
| 5,589,815 A | 12/1996 | Nishihara et al. ....... 340/444 |

(Continued)

*Primary Examiner*—Phung T. Nguyen
(74) *Attorney, Agent, or Firm*—Gary Smith

(57) ABSTRACT

A tire pressure monitoring system (12) for a vehicle (10) has a plurality of tires (14a–d) in respective rolling locations having a respective plurality of tire transmitters (16a–d) that generate a respective plurality of transmitter identification signals. A respective plurality of initiators (20a–d) are fixedly attached to the vehicle at a respective plurality of locations. A controller (22) activates the plurality of initiators and receives a plurality of respective sensor signals having respective tire identifications. When the plurality of respective sensor signals is indicative of an initial status and the respective plurality of tire identification signals is not existing in a memory, the plurality of sensor signals are configured and stored in the memory. When the plurality of respective sensor signals is indicative of an initial status and the plurality of respective tire identification signals is existing in the memory, the controller confirms the first sensor signal. When the plurality of sensor statuses is unconfirmed, the controller 22 performs the steps of activating, receiving and confirming until a proper signal is received or the number of times tried exceeds a predetermined count.

17 Claims, 21 Drawing Sheets

U.S. PATENT DOCUMENTS

| | | | |
|---|---|---|---|
| 5,600,301 A | 2/1997 | Robinson, III | 340/442 |
| 5,602,524 A | 2/1997 | Mock et al. | 340/447 |
| 5,612,671 A | 3/1997 | Mendez et al. | 340/447 |
| 5,656,993 A | 8/1997 | Coulthard | 340/442 |
| 5,661,651 A | 8/1997 | Geschke et al. | 364/424.034 |
| 5,717,376 A | 2/1998 | Wilson | 340/442 |
| 5,721,528 A | 2/1998 | Boesch et al. | 340/442 |
| 5,741,966 A | 4/1998 | Handfield et al. | 73/146.5 |
| 5,790,016 A * | 8/1998 | Konchin et al. | 340/448 |
| 5,801,306 A | 9/1998 | Chamussy et al. | 73/146.2 |
| 5,808,190 A | 9/1998 | Ernst | 73/146.5 |
| 5,838,229 A | 11/1998 | Robinson, III | 340/442 |
| 5,853,020 A | 12/1998 | Widner | 137/227 |
| 5,880,363 A * | 3/1999 | Meyer et al. | 73/146.5 |
| 5,913,240 A | 6/1999 | Drahne et al. | 73/146 |
| 5,926,087 A | 7/1999 | Busch et al. | 340/438 |
| 5,939,977 A | 8/1999 | Monson | 340/442 |
| 5,959,202 A | 9/1999 | Nakajima | 73/146.2 |
| 5,963,128 A | 10/1999 | McClelland | 340/447 |
| 5,965,808 A | 10/1999 | Normann et al. | 73/146.5 |
| 5,969,236 A | 10/1999 | Hirota et al. | 73/61.75 |
| 5,990,785 A | 11/1999 | Suda | 340/426 |
| 5,999,091 A | 12/1999 | Wortham | 340/431 |
| 6,002,327 A | 12/1999 | Boesch et al. | 340/442 |
| 6,034,597 A | 3/2000 | Normann et al. | 340/447 |
| 6,043,738 A | 3/2000 | Stewart et al. | 340/447 |
| 6,046,672 A | 4/2000 | Pearman | 340/447 |
| 6,078,252 A | 6/2000 | Kulczycki et al. | 340/425.5 |
| 6,111,520 A | 8/2000 | Allen et al. | 340/870.16 |
| 6,161,071 A | 12/2000 | Shuman et al. | 701/48 |
| 6,199,575 B1 | 3/2001 | Widner | 137/227 |
| 6,204,758 B1 | 3/2001 | Wacker et al. | 340/444 |
| 6,218,936 B1 * | 4/2001 | Imao | 340/447 |
| 6,225,895 B1 | 5/2001 | Bigelow, Jr. | 340/442 |
| 6,232,875 B1 | 5/2001 | DeZorzi | 340/442 |
| 6,246,317 B1 | 6/2001 | Pickornik et al. | 340/447 |
| 6,259,361 B1 | 7/2001 | Robillard et al. | 340/447 |
| 6,271,748 B1 | 8/2001 | Derbyshire et al. | 340/442 |
| 6,275,231 B1 | 8/2001 | Obradovich | 345/349 |
| 6,278,363 B1 | 8/2001 | Bezek et al. | 340/442 |
| 6,278,379 B1 | 8/2001 | Allen et al. | 340/870.16 |
| 6,292,096 B1 | 9/2001 | Munch et al. | 340/445 |
| 6,293,147 B1 | 9/2001 | Parker et al. | 73/462 |
| 6,327,570 B1 | 12/2001 | Stevens | 705/7 |
| 6,339,736 B1 | 1/2002 | Moskowitz et al. | 701/29 |
| 6,369,703 B1 | 4/2002 | Lill | 340/447 |
| 6,385,511 B1 | 5/2002 | Fondeur et al. | 701/1 |
| 6,446,502 B1 | 9/2002 | Normann et al. | 73/146.5 |
| 6,448,891 B1 | 9/2002 | Barnett | 340/438 |
| 6,448,892 B1 | 9/2002 | Delaporte | 340/442 |
| 6,453,737 B1 | 9/2002 | Young et al. | 73/146.5 |
| 6,463,798 B1 | 10/2002 | Niekerk et al. | 73/146.2 |
| 6,498,967 B1 * | 12/2002 | Hopkins et al. | 701/1 |
| 6,518,876 B1 | 2/2003 | Marguet et al. | 340/447 |
| 6,612,165 B1 | 9/2003 | Juzswik et al. | 73/146.5 |
| 6,667,687 B1 | 12/2003 | DeZorzi | 340/447 |
| 2001/0008083 A1 | 7/2001 | Brown | 73/146.5 |
| 2002/0008718 A1 | 1/2002 | Obradovich | |

* cited by examiner

| Flat Pressure | Low Pressure | High Pressure | Pressure Status |
|---|---|---|---|
| False | False | False | IN_RANGE |
| True | Don't Care | Don't Care | FLAT |
| False | True | Don't Care | LOW |
| False | False | True | HIGH |

FIG. 10

METHOD AND APPARATUS FOR AUTOMATICALLY IDENTIFYING THE LOCATION OF PRESSURE SENSORS IN A TIRE PRESSURE MONITORING SYSTEM

CROSS REFERENCE TO RELATED APPLICATIONS

The present invention is related to applications Ser. No. 10/064,688 entitled "Method And System For Mitigating False Alarms In A Tire Pressure Monitoring System For An Automotive Vehicle" Ser. No. 10/064,693 entitled "Method And System For Resetting Tire Pressure Monitoring System For An Automotive Vehicle"; Ser. No. 10/064,694 entitled "Method And System For Detecting The Presence Of A Spare Replacement In A Tire Pressure Monitoring System For An Automotive Vehicle" Ser. No. 10/064,695 entitled "Method And System For Automatically Extending A Tire Pressure Monitoring System For An Automotive Vehicle To Include Auxiliary Tires" Ser. No. 10/064,687 entitled "Method And System Of Notifying Of Overuse Of A Mini-Spare Tire In A Tire Pressure Monitoring System For An Automotive Vehicle" Ser. No. 10/064,690 entitled "Method And Apparatus For Identifying The Location Of Pressure Sensors In A Tire Pressure Monitoring System" Ser. No. 10/064,692 entitled "Tire Pressure Monitoring System With A Signal Initiator" Ser. No. 10/064,689 entitled "Method And Apparatus For Reminding The Vehicle Operator To Refill The Spare Tire In A Tire Pressure Monitoring System" filed simultaneously herewith and incorporated by reference herein.

BACKGROUND OF INVENTION

The present invention relates generally to a tire pressure monitoring system for an automotive vehicle, and more particularly, to a method and system for automatically determining the pressure sensor locations relative to the vehicle.

Various types of pressure sensing systems for monitoring the pressure within the tires of an automotive vehicle have been proposed. Such systems generate a pressure signal using an electromagnetic (EM) signal which is transmitted to a receiver. The pressure signal corresponds to the pressure within the tire. When the tire pressure drops below a predetermined pressure, an indicator is used to signal the vehicle operator of the low pressure. Many vehicles require different tire pressures in the front of the vehicle and the rear of the vehicle. Therefore, it is important to know the relative position of the pressure sensor and thus the tires relative to the vehicle. Known systems provide manual means for programming the relative positions. For example, a magnet is positioned manually near the tire to allow the system to recognize the position of the tire. Such systems rely on the vehicle operator performing the recognition in a particular order. Such systems, however, are prone to errors.

It would therefore be desirable to provide a tire pressure monitoring system that automatically identifies the position of each tire relative to the vehicle.

SUMMARY OF INVENTION

The present invention provides a system and method for automatically identifying the position of the tires relative to the vehicle.

In one aspect of the invention, a tire pressure monitoring system for a vehicle has a plurality of tires in respective rolling locations having a respective plurality of tire transmitters that generate a respective plurality of transmitter identification signals. A respective plurality of initiators are fixedly attached to the vehicle at a respective plurality of locations. A controller activates the plurality of initiators and receives a plurality of respective sensor signals having respective tire identifications. When the plurality of respective sensor signals is indicative of an initial status and the respective plurality of tire identification signals is not existing in a memory, the plurality of sensor signals are confirmed and stored in the memory. When the plurality of respective sensor signals is indicative of an initial status and the plurality of respective tire identification signals is existing in the memory, the controller confirms the first sensor signal. When the plurality of sensor statuses is unconfirmed, the controller performs the steps of activating, receiving and confirming until a proper signal is received or the number of times tried exceeds a predetermined count.

In a further aspect of the invention, a method of operating a tire pressure monitoring system having a plurality of tire locations comprises: activating a first initiator signal from a first initiator at a first tire location of the plurality of tire locations; generating a first sensor signal having a first tire identification and an initiate portion in response to the first initiator signal; receiving a first sensor signal; storing the first sensor identification in the memory associated with the first of the plurality of tire locations when the first sensor identification is not in the memory; repeating the steps of activating, generating, receiving and storing for each of the plurality of tire locations.

One advantage of the invention is that no operator intervention is required for the identification, which in one embodiment, may be performed every time the vehicle is running and the speed exceeds a predetermined speed such as 20 miles an hour. This prevents the vehicle operator from inadvertently forgetting to reset the system.

Other advantages and features of the present invention will become apparent when viewed in light of the detailed description of the preferred embodiment when taken in conjunction with the attached drawings and appended claims.

BRIEF DESCRIPTION OF DRAWINGS

FIG. 10 is a table of sensor status according to the present invention.

DETAILED DESCRIPTION will be used to illustrate the same components. Those skilled in the art will recognize that the various components set forth herein could be changed without varying from the scope of the invention.

Figure 1:
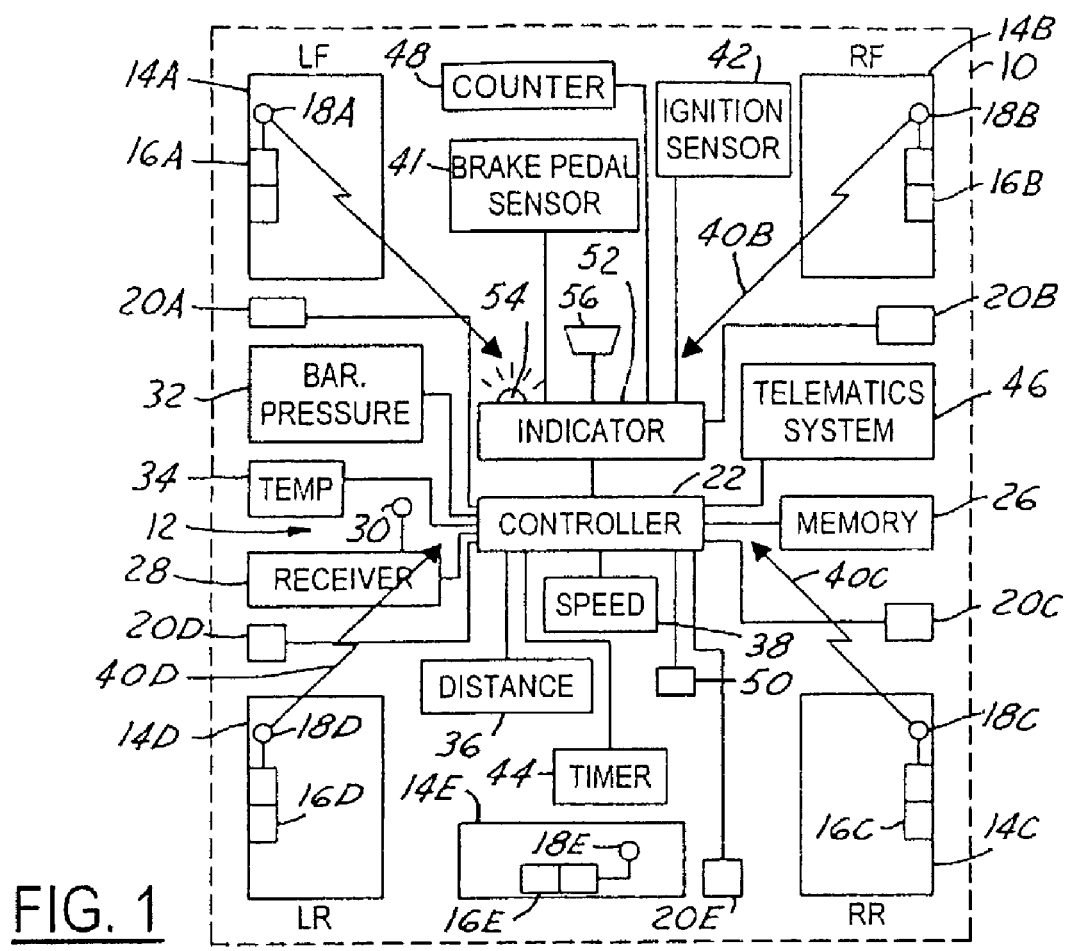
FIG. 1 is a block diagrammatic view of a pressure monitoring system according to the present invention.

Referring now to FIG. 1, an automotive vehicle 10 has a pressure monitoring system 12 for monitoring the air pressure within a left front tire 14a, a right front tire 14b, a right rear tire 14c, and a left rear tire 14d. Each tire 14a–14d has a respective tire pressure sensor circuit 16a, 16b, 16c, and 16d, each of which has a respective antenna 18a, 18b, 18c, and 18d. Each tire is positioned upon a corresponding wheel.

A fifth tire or spare tire 14e is also illustrated having a tire pressure sensor circuit 16e and a respective antenna 18e. Although five wheels are illustrated, the pressure of various numbers of wheels may be increased. For example, the present invention applies equally to vehicles such as pickup trucks that have dual wheels for each rear wheel. Also, various numbers of wheels may be used in a heavy duty truck application having dual wheels at a number of locations. Further, the present invention is also applicable to trailers and extra spares as will be further described below.

Each tire 14 may have a respective initiator 20a–20e positioned within the wheel wells adjacent to the tire 14. Initiator 20 generates a low frequency RF signal initiator and is used to initiate a response from each wheel so that the position of each wheel may be recognized automatically by the pressure monitoring system 12. Initiators 20a–20e are preferably coupled directly to a controller 22. In commercial embodiments where the position programming is done manually, the initiators may be eliminated.

Controller 22 is preferably a microprocessor based controller having a programmable CPU that may be programmed to perform various functions and processes including those set forth herein.

Controller 22 has a memory 26 associated therewith. Memory 26 may be various types of memory including ROM or RAM. Memory 26 is illustrated as a separate component. However, those skilled in the art will recognize controller 22 may have memory 26 therein. Memory 26 is used to store various thresholds, calibrations, tire characteristics, wheel characteristics, serial numbers, conversion factors, temperature probes, spare tire operating parameters, and other values needed in the calculation, calibration and operation of the pressure monitoring system 12. For example, memory may contain a table that includes the sensor identification thereof. Also, the warning statuses of each of the tires may also be stored within the table.

Controller 22 is also coupled to a receiver 28. Although receiver 28 is illustrated as a separate component, receiver 28 may also be included within controller 22. Receiver 28 has an antenna 30 associated therewith. Receiver 30 is used to receive pressure and various information from tire pressure circuits 16a–16e. Controller 22 is also coupled to a plurality of sensors. Such sensors may include a barometric pressure sensor 32, an ambient temperature sensor 34, a distance sensor 36, a speed sensor 38, a brake pedal sensor 40, and an ignition sensor 42. Of course, various other types of sensors may be used. Barometric pressure sensor 32 generates a barometric pressure signal corresponding to the ambient barometric pressure. The barometric pressure may be measured directly, calculated, or inferred from various sensor outputs. The barometric pressure compensation is preferably used but is not required in calculation for determining the pressure within each tire 14. Temperature sensor 34 generates an ambient temperature signal corresponding to the ambient temperature and may be used to generate a temperature profile.

Distance sensor 36 may be one of a variety of sensors or combinations of sensors to determine the distance traveled for the automotive vehicle. The distance traveled may merely be obtained from another vehicle system either directly or by monitoring the velocity together with a timer 44 to obtain a rough idea of distance traveled. Speed sensor 38 may be a variety of speed sensing sources commonly used in automotive vehicles such as a two wheel used in anti-lock braking systems, or a transmission sensor.

Timer 44 may also be used to measure various times associated with the process set forth herein. The timer 44, for example, may measure the time the spare tire is stowed, or measure a time after an initiator signal.

Brake pedal sensor 41 may generate a brake-on or brake-off signal indicating that the brake pedal is being depressed or not depressed, respectively. Brake pedal sensor 41 may be useful in various applications such as the programming or calibrating of the pressure monitoring system 12.

Ignition sensor 42 may be one of a variety of types of sensors to determine if the ignition is powered on. When the ignition is on, a run signal may be generated. When the ignition is off, an off signal is generated. A simple ignition switch may act as an ignition sensor 42. Of course, sensing the voltage on a particular control line may also provide an indication of whether the ignition is activated. Preferably, pressure monitoring system 12 may not be powered when the ignition is off. However, in one constructed embodiment, the system receives information about once an hour after the ignition has been turned off.

A telemetric system 46 may be used to communicate various information to and from a central location from a vehicle. For example, the control location may keep track of service intervals and use and inform the vehicle operator service is required.

A counter 48 may also be included in control system 12. Counter 48 may count, for example, the number of times a particular action is performed. For example, counter 48 may be used to count the number of key-off to key-on transitions. Of course, the counting function may be inherent in controller 22.

Controller 22 may also be coupled to a button 50 or plurality of buttons 50 for inputting various information, resetting the controller 22, or various other functions as will be evident to those skilled in the art through the following description.

Controller 22 may also be coupled to an indicator 52. Indicator 52 may include an indicator light or display panel 54, which generates a visual signal, or an audible device 56 such as a speaker or buzzer that generates an audible signal. Indicator 52 may provide some indication as to the operability of the system such as confirming receipt of a signal such as a calibration signal or other commands, warnings, and controls as will be further described below. Indicator may be an LED or LCD panel used to provide commands to the vehicle operator when manual calibrations are performed.

Figure 2:
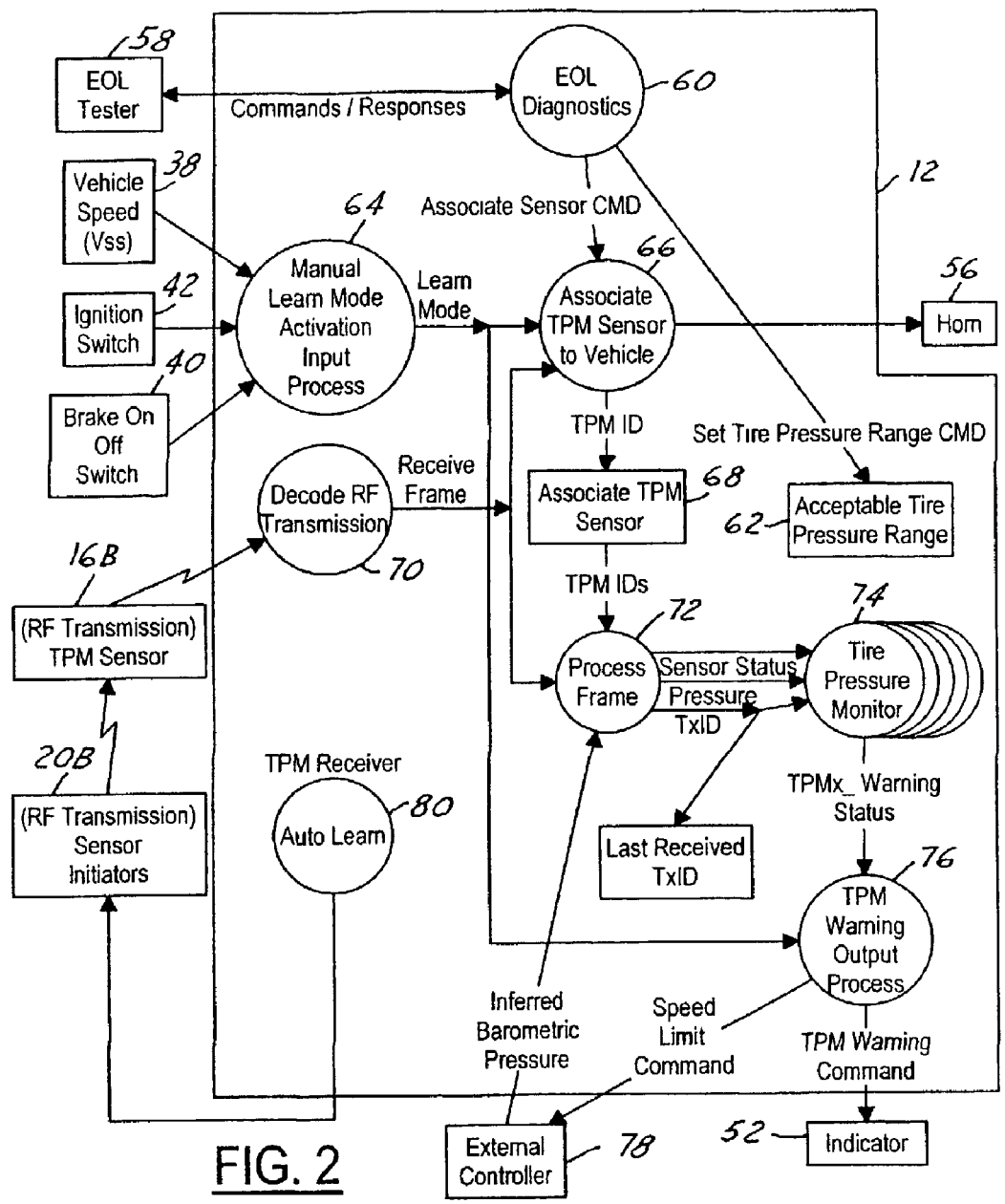
FIG. 2 is a functional flowchart of the monitoring system according to the present invention.

Referring now to FIG. 2, a pressure monitoring system 12 having various functional blocks is illustrated. These functional blocks may take place within receiver 28, controller 22, or a combination thereof. Also, memory 26 is used to store the various ranges. An end-of-line (EOL) tester 58 may also be coupled to pressure monitoring system. EOL tester 58 provides test functions to EOL diagnostic block 60. EOL tester 58 in conjunction with EOL diagnostic block 60 may be used to provide acceptable pressure ranges 62 and other diagnostic functions to determine fault within the system. The EOL tester 58 may be used in the manufacturing process to store various information in the memory such as various thresholds, tire characteristics, and to initially program the locations corresponding to the vehicle tires.

Vehicle speed sensor 38, ignition switch 42, and brake on/off switch 41 may be coupled to a manual learn mode activation input process block 64. Together block 64 and sensors 38, 41, and 42 allow an association block 66 to associate the various tire pressure sensors to the locations of the vehicles. Block 66 associates the various tire pressure sensors in the memory at block 68. The transmissions from the various sensors are decoded in block 70, which may be performed in receiver 28 above. The decoded information is provided to block 66 and to a block 72, which processes the various information such as the ranges, the various sensor locations, and the current transmission process. In the processing frame the sensor status pressure and transmission ID may be linked to a tire pressure monitor 74 which may be used to provide a warning status to an output block 76 which in turn may provide information to an external controller 78 and to indicator 52.

An auto learn block 80 may also be used to associate the various tire pressure sensor monitors with the locations of the tires in the vehicle. This process may replace or be in addition to the manual learn block 64. The auto learn function, however, uses initiators such as the initiator 20b as shown. The various features of FIG. 2 will be described further in more detail.

Figure 3:
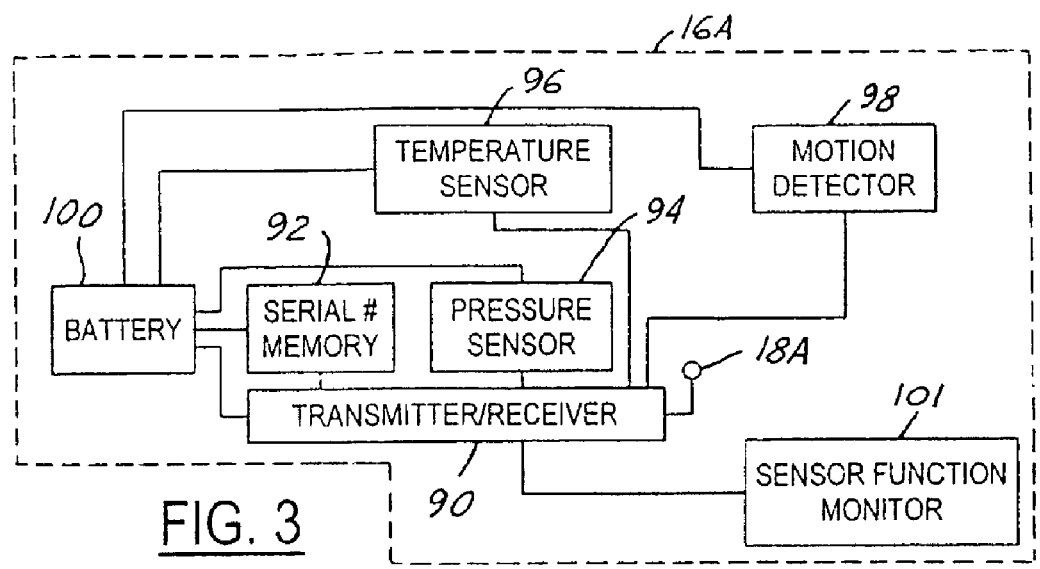
FIG. 3 is a block diagrammatic view of a pressure transmitter according to the present invention.

Referring now to FIG. 3, a typical tire pressure sensor circuit 16a is illustrated. Although only one tire pressure sensor circuit 16 is shown, each may be commonly configured. Pressure monitoring system 12 has a transmitter/receiver or transceiver 90. Transmitter/receiver 90 is coupled to antenna 18a for transmitting various information to receiver 28. The receiver portion may be used to receive an activation signal for an initiator located at each wheel. The pressure sensor may have various information such as a serial number memory 92, a pressure sensor 94 for determining the pressure within the tire, a temperature sensor 96 for determining the temperature within the tire, and a motion detector 98 which may be used to activate the system pressure sensing system. The initial message is referred to as a "wake" message, meaning the pressure sensing circuit is now activated to send its pressure transmissions and the other data.

Each of the transceiver 90, serial number memory 92, pressure sensor 94, temperature sensor 96, and motion sensor 98 coupled to battery 100. Battery 100 is preferably a long-life battery capable of lasting through the life of the tire.

A sensor function monitor 101 may also be incorporated into tire pressure sensor circuit 16. Sensor function monitor 101 generates an error signal when various portions of the tire pressure circuit are not operating or are operating incorrectly. Also, sensor function monitor may generate a signal indicating that the circuit 16 is operating normally.

Figure 4:
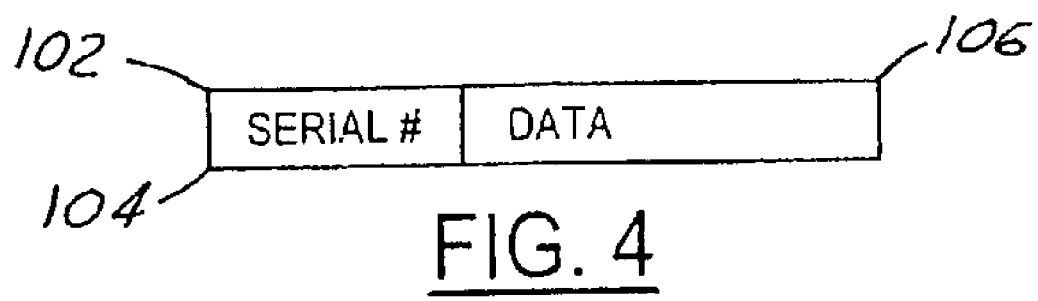
FIG. 4 is a diagrammatic view of a digital word from a pressure transmitter.

Referring now also to FIG. 4, a word 102 generated by the tire pressure sensor circuit 16 of FIG. 3 is illustrated. Word 102 may comprise a transmitter identification serial number portion 104 followed by a data portion 106 in a predetermined format. For example, data section 106 may include a wake or initial status pressure information followed by temperature information. Motion detector 28 may initiate the transmission of the word 102 to the transmitter/receiver 90. The word 102 is preferably such that the decode RF transmission block 70 is able to decode the information and validate the word while providing the identification number or serial number, the pressure, the temperature, and a sensor function.

Figure 5:
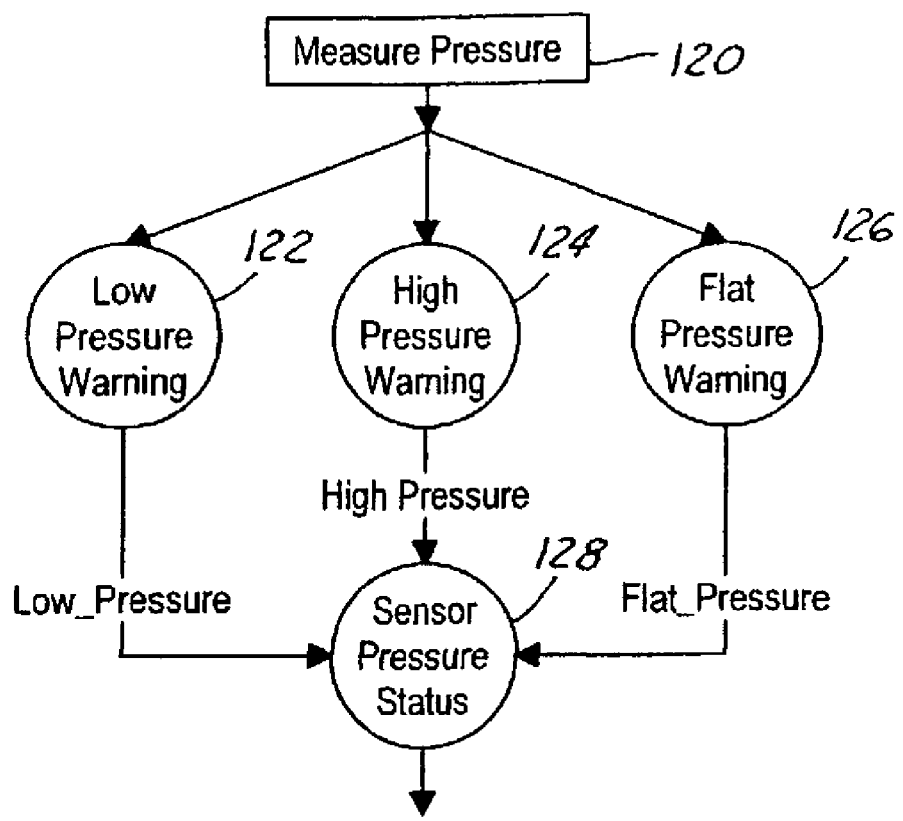
FIG. 5 is a flow chart illustrating determining a pressure status in a first stage of pressure determination according to the present invention.

Referring now to FIG. 5, a high level flow chart illustrating obtaining a sensor pressure status from the measured pressure is illustrated. The pressure status is determined in a similar manner for each of the tires on the vehicle. In block 120 the pressure is measured at the pressure sensor and transmitted to the receiver and is ultimately used in the controller. The pressure measured is compared to a low pressure threshold and a low pressure warning is generated if the measured pressure is below the low pressure threshold. In block 124 if the measured pressure is above the high pressure warning, then a high pressure warning is generated. In block 126 if the measured pressure is below a flat pressure, then a flat pressure warning is generated. In block 128 the pressure status is obtained from blocks 122, 124, and 126. The sensor pressure status is a first stage of pressure monitoring according to the present invention.

Figure 6:
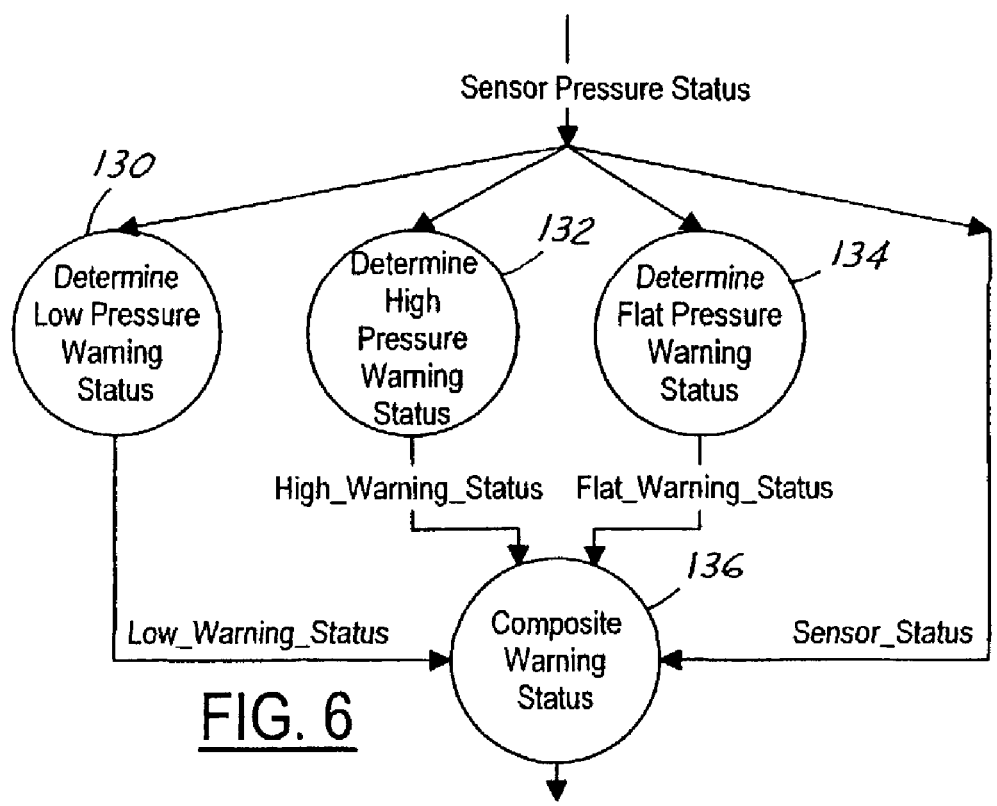
FIG. 6 is a flow chart illustrating determining a warning status in a second stage of pressure determination according to the present invention.

Referring now to FIG. 6, a second stage of pressure monitoring is illustrated in a high level flow chart view. Once the sensor pressure status is obtained in block 128 of FIG. 5, a low pressure warning status, a high pressure warning status, a flat pressure warning status, and an overall sensor status is used to form a composite warning status. In block 130 the low pressure warning status is determined. In block 132 the high pressure warning status is determined. In block 134 a flat pressure warning status is determined. As will be further described below, preferably several measurements take place during normal operation to confirm the status. Each of the low pressure warning status, high pressure warning status, and flat pressure warning status are combined together to form the composite warning status in block 136. The low pressure warning status, the high pressure warning status, and the flat pressure warning status may have two statuses indicative of a warning state indicating the conditions are not met and a not warning state indicating the conditions are not met.

Figure 7:
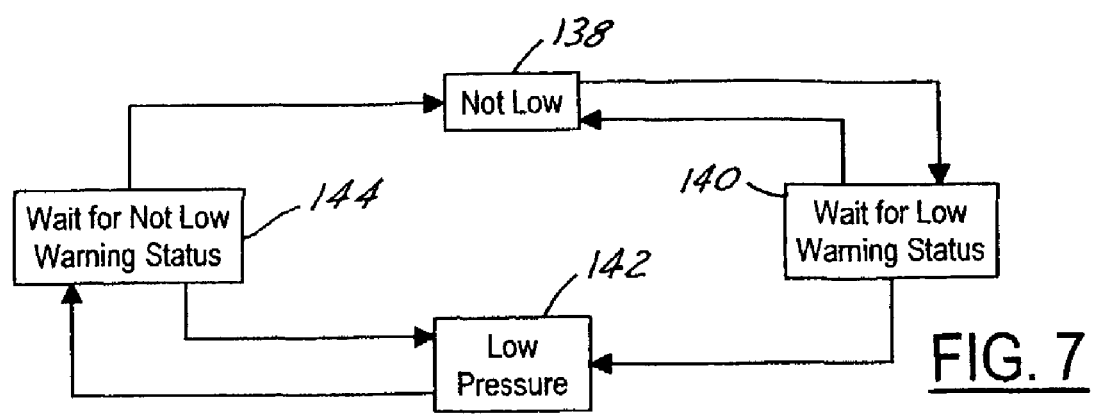
FIG. 7 is a state diagram of low pressure sensor status according to the present invention.

Referring now to FIG. 7, a state diagram for determining the sensor pressure status is illustrated. Block 138 corresponds to a not low sensor status. In the following example, both the front tire pressure and the rear tire pressure may have different threshold values. Also, the spare tire may also have its own threshold values. When any of the tires is below its low pressure threshold and a warning status is not low, block 140 is performed. Of course, those in the art will recognize that some hysteresis may be built into the system so that not exactly the same thresholds may be used to transition back. In block 140 the low warning status is determined in the second stage as will be described below. In block 140 when the warning status is not low and the sensor is equal to or above the threshold for the tire, then the sensor pressure status is not low and the system returns to block 138. In block 140 when a low warning status is determined, then block 142 is performed. In block 142 when the pressure is greater than or equal to the threshold pressure of the associated tire, then block 144 is performed. In block 144 a "not low" warning status is determined as will be further described below. When the tire pressures are less than their associated low thresholds, then block 142 is executed. In block 144 when a warning status of not low is determined, block 138 is executed. Blocks 138 through 144 illustrate a continuous loop in which the sensor readings are monitored and a sensor pressure status and warning status are used to move therethrough.

Figure 8:
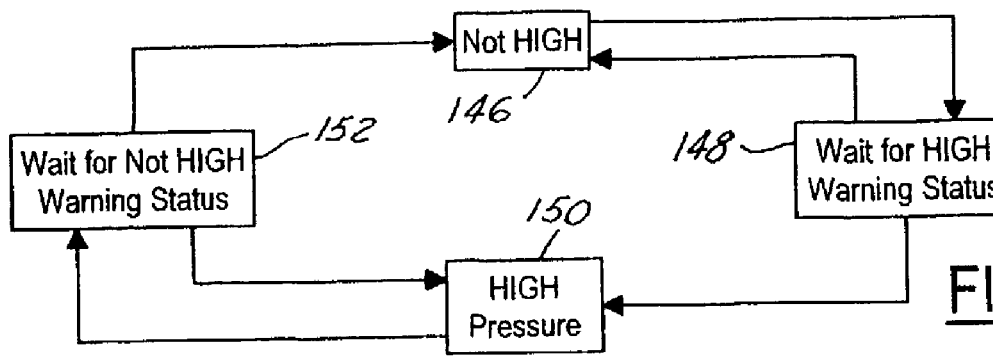
FIG. 8 is a state diagram of high pressure sensor status according to the present invention.

Referring now to FIG. 8, a similar state diagram to that of FIG. 7 is illustrated relative to a high pressure threshold. In block 146 the warning status is not high. To move from block 146 to 148 the pressure of the particular tire exceeds a high pressure threshold. When the pressure reading exceeds one of the high pressure thresholds for one of the tires, block 148 determines a high warning status. A high warning status is determined as will be further described below. When subsequent readings of the pressure sensor are lower than or equal to the high pressure threshold, then block 146 is again executed. In block 148 if the high warning status criteria are met, a high warning status is generated and block 150 is executed. Again, the thresholds may be offset slightly to provide hysteresis. In block 150 when the pressure reading drops below a high pressure threshold then block 144 is executed. If subsequent readings are greater than the high pressure threshold then block 150 is again executed. In block 152 when the not high warning status criteria are met, as will be further described below, a not high warning status is generated and block 146 is again executed.

Figure 9:
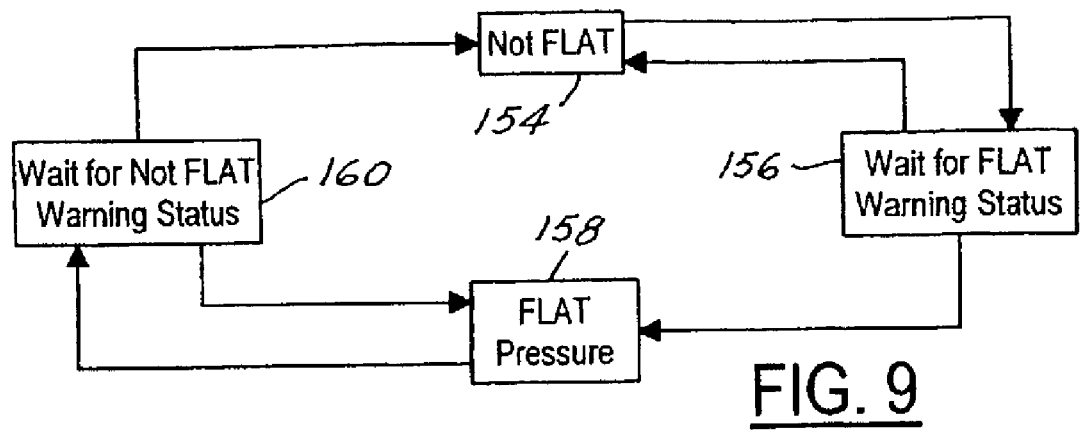
FIG. 9 is a state diagram of a flat pressure sensor status.

Referring now to FIG. 9, a state diagram for determining the presence of a flat tire is illustrated. When the warning status is not flat and the tire pressure for each tire falls below a predetermined flat threshold, then block 156 is executed. Again, the thresholds may be offset slightly to provide hysteresis. In block 56 if a subsequent pressure reading is greater than the flat threshold, then block 154 is again executed. In block 156, if the criteria for generating a flat warning status is met, as will be further described below, block 158 is executed. In block 158 when the pressure reading of a subsequent reading exceeds or is equal to a flat threshold, then block 160 is executed. Block 160 determines a not flat warning status in a similar manner to that of block 156. In block 160 if the subsequent readings drop below the flat warning threshold, then block 158 is again executed. In block 160 if the criteria for not flat warning status is met, then block 154 is executed.

Preferably, the processes shown in FIGS. 7, 8, and 9 are simultaneously performed for each wheel.

Referring now to FIG. 10, the results obtained from FIGS. 7, 8, and 9 are shown in respective columns. True in the columns refers to that pressure threshold being crossed. Thus, the output pressure status shown in the right hand column is "in range" when each of the pressure thresholds are not met. A flat pressure status refers to the flat pressure threshold being met. A low pressure status is obtained when a low pressure threshold is crossed, and a high pressure status when a high pressure threshold is exceeded.

Figure 11:
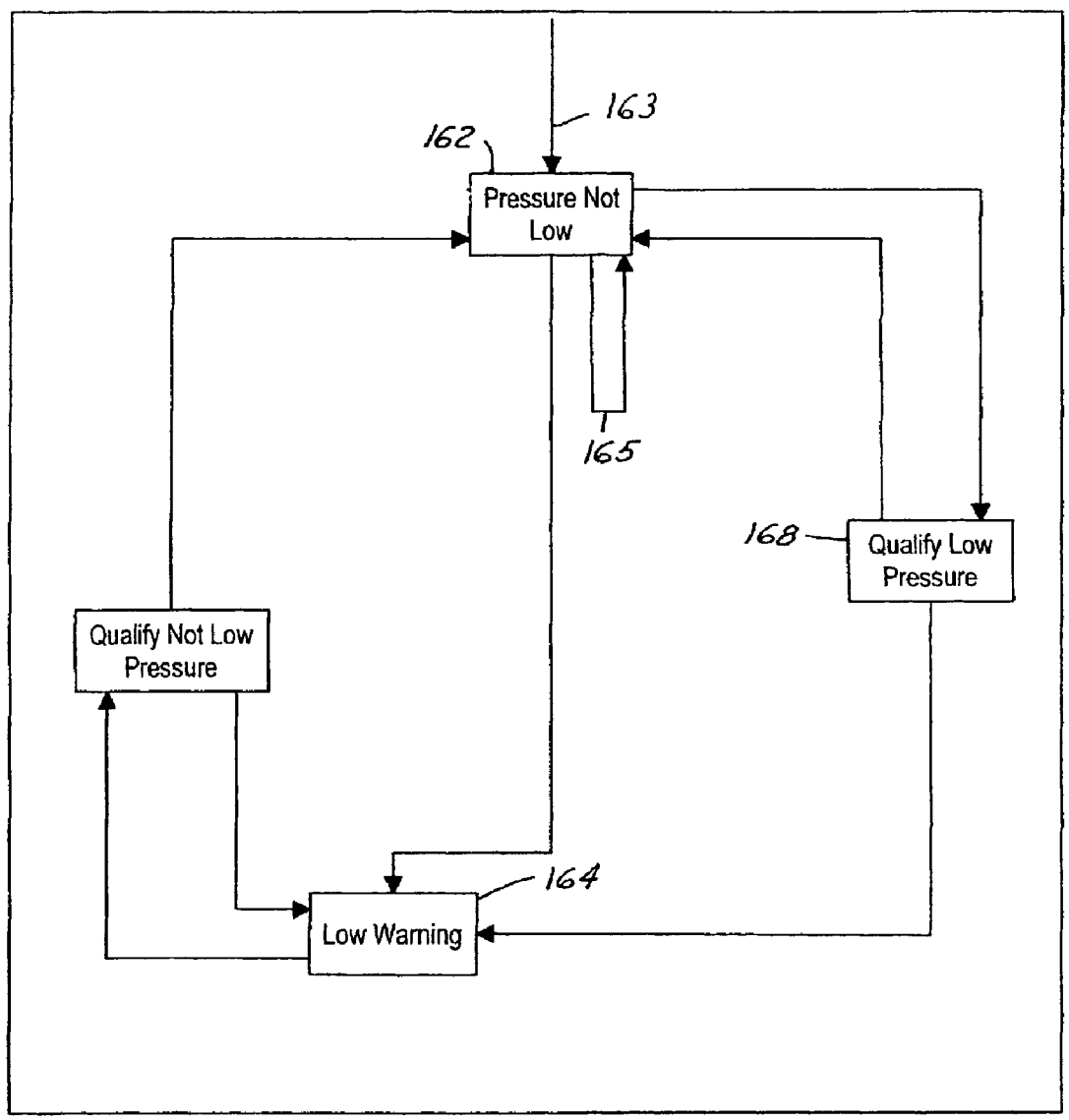
FIG. 11 is a state diagram of a low pressure warning status.

Referring now to FIG. 11, blocks 140 and 144 of FIG. 7 are illustrated in further detail. In each of these blocks the qualification process for either a pressure not low warning status or a low pressure warning status is illustrated. Upon an initial status reading the system is set to a false low warning status as indicated by arrow 163 and block 162 is executed. On the initial status reading, if a low pressure status is obtained in the first reading, block 164 is executed which immediately generates a low warning status. Thus, no waiting periods or other measurements are necessary from an initial standpoint. Loop 165 back to the pressure not low block 162 signifies that the initial value was in range and the status value is not an initial value. When the pressure status signal is low from FIG. 7, a warning qualification process is started in block 168. In block 168 if subsequent pressure status signals are not low, block 162 is executed. In block 168 if a predetermined number of pressure status signals are low or a certain number of pressure status signals over a fixed time period are low, for example five warning events, block 164 is executed. In block 164 when a not low pressure status is obtained a qualification timer is initiated in block 170. If a subsequent low pressure warning is received, then block 164 is again executed. In block 170 if a low warning qualification timer expires, the low warning status if false or "not low pressure" and block 162 is executed. The warning status is initiated as represented by arrow 163 by a wake message received from a spare and the vehicle speed is greater than three miles per hour and the low warning status indicates the tire pressure is not low.

Figure 12:
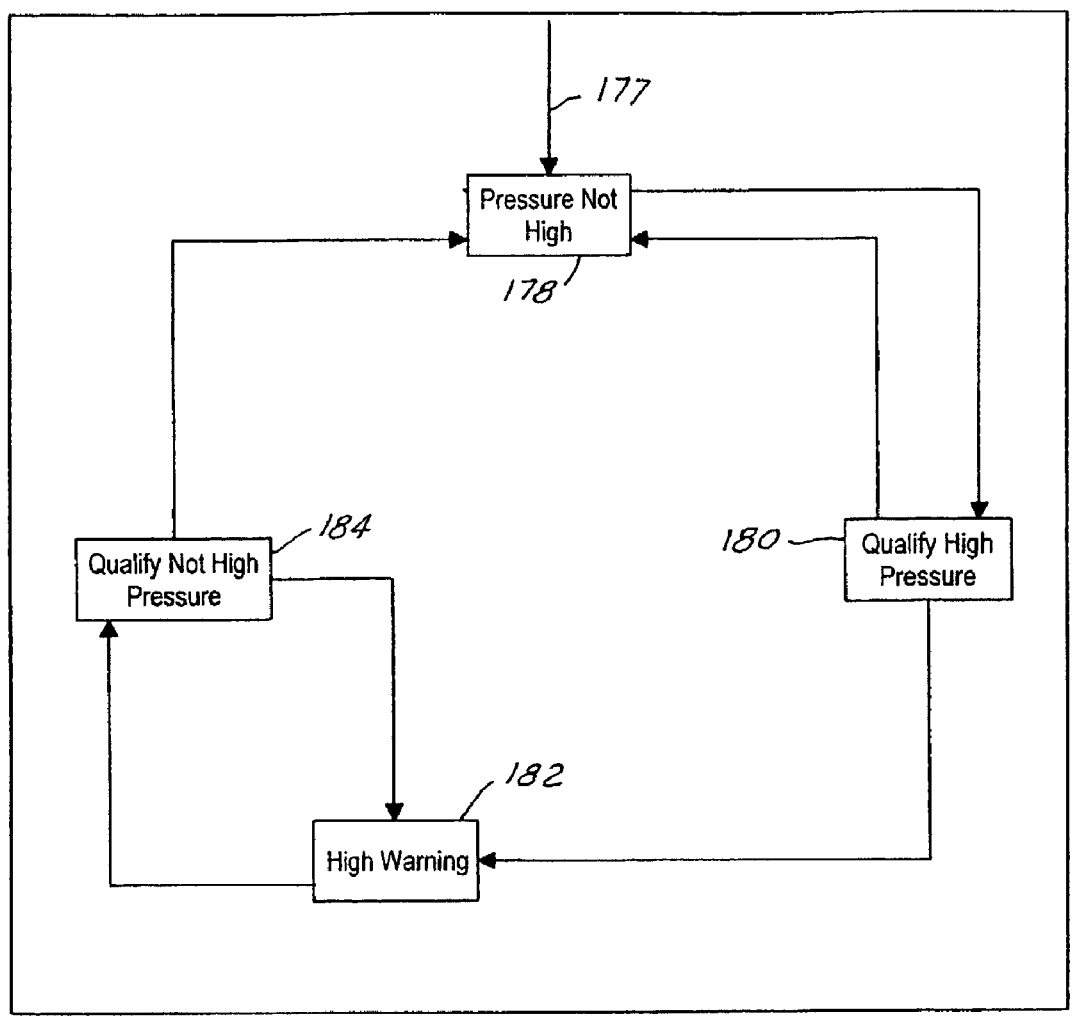
FIG. 12 is a state diagram of a high pressure warning status.

Referring now to FIG. 12, a state diagram of the qualification for generating a warning status for high pressure is illustrated. Once again, an initial step represented by arrow 177 is a default state in which the initial status is set to not high. In block 178 when the pressure sensor status is high, block 180 is executed in which the high pressure is qualified. In the transition from block 178 to 180 a high warning qualification process is initiated. As mentioned above in FIG. 11, the qualification may be a predetermined number of sequential pressure sensor status readings being high or a predetermined number of pressure sensor status readings being high over a predetermined time. In block 180 if a pressure status is not high before qualification, step 178 is re-executed. In block 180 if a predetermined of pressure sensor status readings are high, then a high warning status is generated in block 182. When a high warning status is generated, if a subsequent pressure status is not high then a qualification timer again starts in block 184. In block 184 if a subsequent pressure status is high then step 182 is executed. In step 184 the not high pressure is qualified before issuing a not high warning status. Thus, a predetermined number of not high pressure statuses must be received before qualification. When a predetermined number of not high pressures are obtained, step 178 is again executed.

Figure 13:
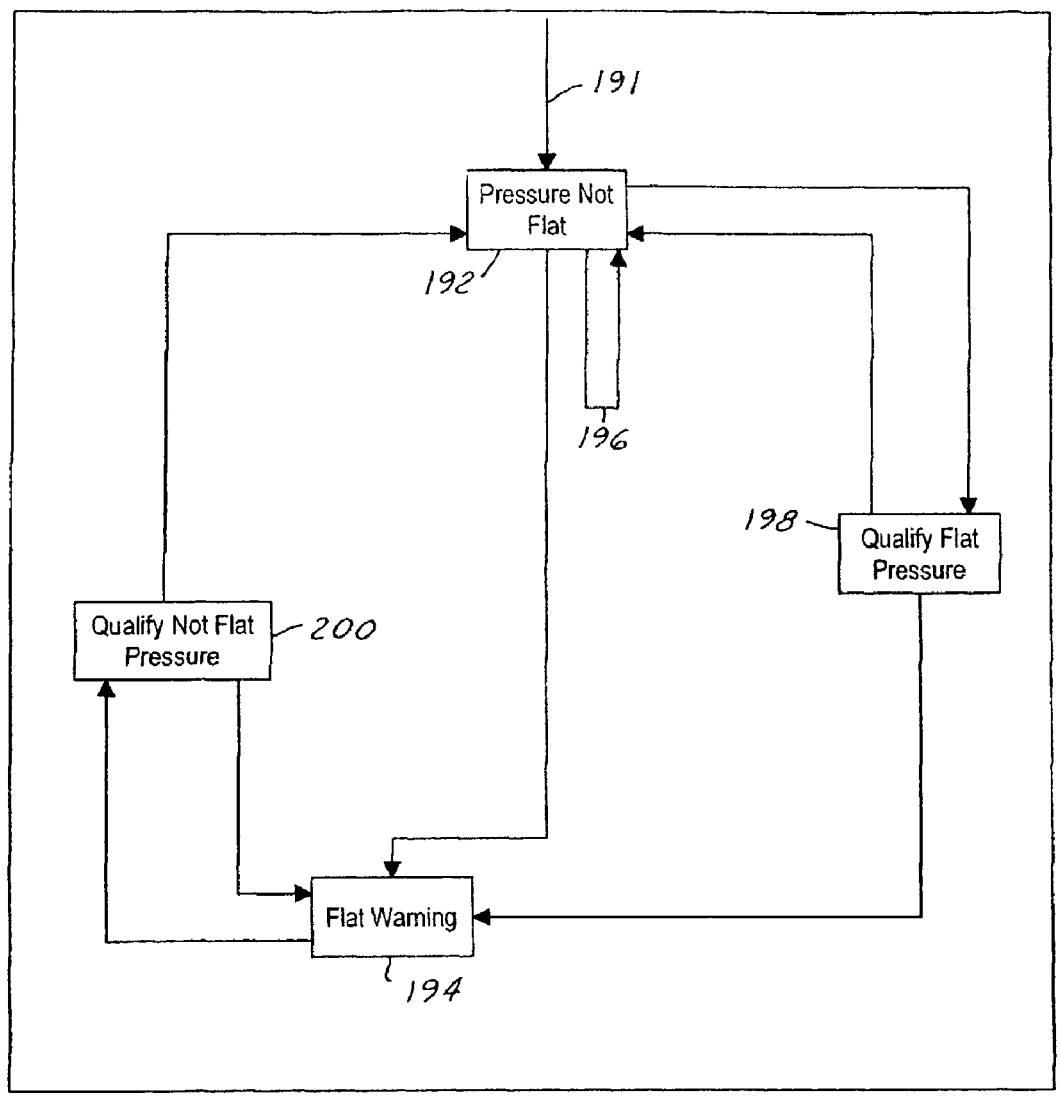
FIG. 13 is a state diagram of a flat pressure warning status.

Referring now to FIG. 13, a flat warning status is generated in a similar manner to the low warning status of FIG. 11. The difference between flat warning and low warning is the flat warning is a substantially lower pressure than the flat warning. This system also begins when a wake up message is received and the speed is greater than three miles per hour. Other considerations may also initiate the process. The default is illustrated by arrow 191. When the first pressure status reading is obtained and the pressure sensor status indicates a flat tire, a flat warning status of true is provided in block 194. Loop 196 resets the initial value flag to false after the initial status value is received. In block 192 if a subsequent sensor pressure status is flat, a qualification timer is initiated in block 198. In block 198 if a not flat sensor pressure status is received, block 192 is again executed. In block 198 if the qualification process has a predetermined number of flat warning events, either consecutively or during a time period, block 194 is executed. In block 194 if a not flat sensor pressure status is obtained a not flat pressure qualification process is initiated in block 200. In block 200 if a subsequent flat warning is received, block 194 is again executed. In block 200 if a predetermined number of not flat pressure statuses are provided, the flat warning status is not false, then block 192 is again executed.

As mentioned above in FIG. 6, the output of the warning status generators of FIGS. 11, 12, and 13 generate a composite warning status as illustrated by the following table.

TABLE

| Sensor Status | Flat Warning Status | Low Warning Status | High Warning Status | Composite Warning Status |
|---|---|---|---|---|
| Don't Care | TRUE | Don't Care | Don't Care | Flat |
| Don't Care | False | TRUE | Don't Care | Low |
| Don't Care | False | False | TRUE | High |
| Transmitter Fau | False | False | False | Fault |
| In Range | False | False | False | In Range |

Thus, the composite warning status has an independent flat warning status portion, a high warning status portion, and a low warning status portion. Also, the composite warning may also include a sensor status portion to indicate a transmitter fault on behalf of the pressure sensor. In response to the composite warning status signal, the tire pressure monitoring system may provide some indication through the indicator such as a displayed word, a series of words, an indicator light or a text message that service or adjustment of the tire pressure may be required.

Figure 14:
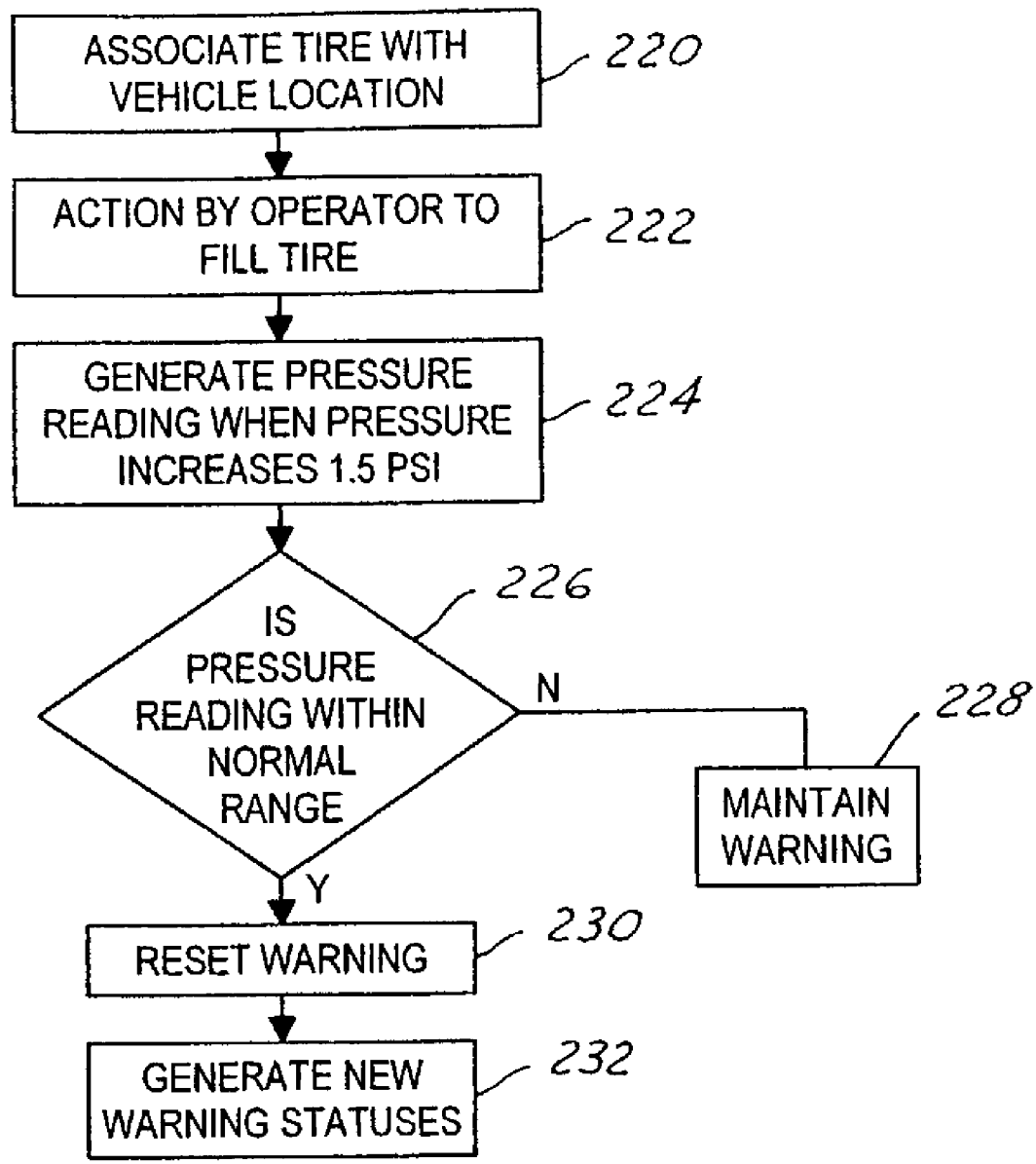
FIG. 14 is a flowchart of the operation of the system when a tire pressure is increased by filling.

Referring now to FIG. 14, a method for automatically updating the system when a pressure suddenly increases. In step 220 the tires are associated with the vehicle locations. Various methods for associating the vehicle tire locations are described herein. In step 222 the operator fills the tire and thereby increases the pressure therein. In step 224 the pressure sensor circuit preferably transmits a pressure reading when an increase of a predetermined amount is sensed. In the present example, 1.5 psi is used. Thus, when the pressure is at least 1.5 psi the system receives a pressure warning from that tire. In step 226 the increased pressure reading is compared to a normal range. If the pressure increase still does not provide a pressure reading within the normal range the warning statuses are maintained in step 228. In step 226 when the new pressure reading is within the normal range the warnings are automatically reset in step 230 for that particular time. The displays and the warning status memory may all be reset.

In step 232 new warning statuses are generated for each of the rolling locations of the vehicle. Also, a new status may also be generated for a spare tire.

Figure 15:
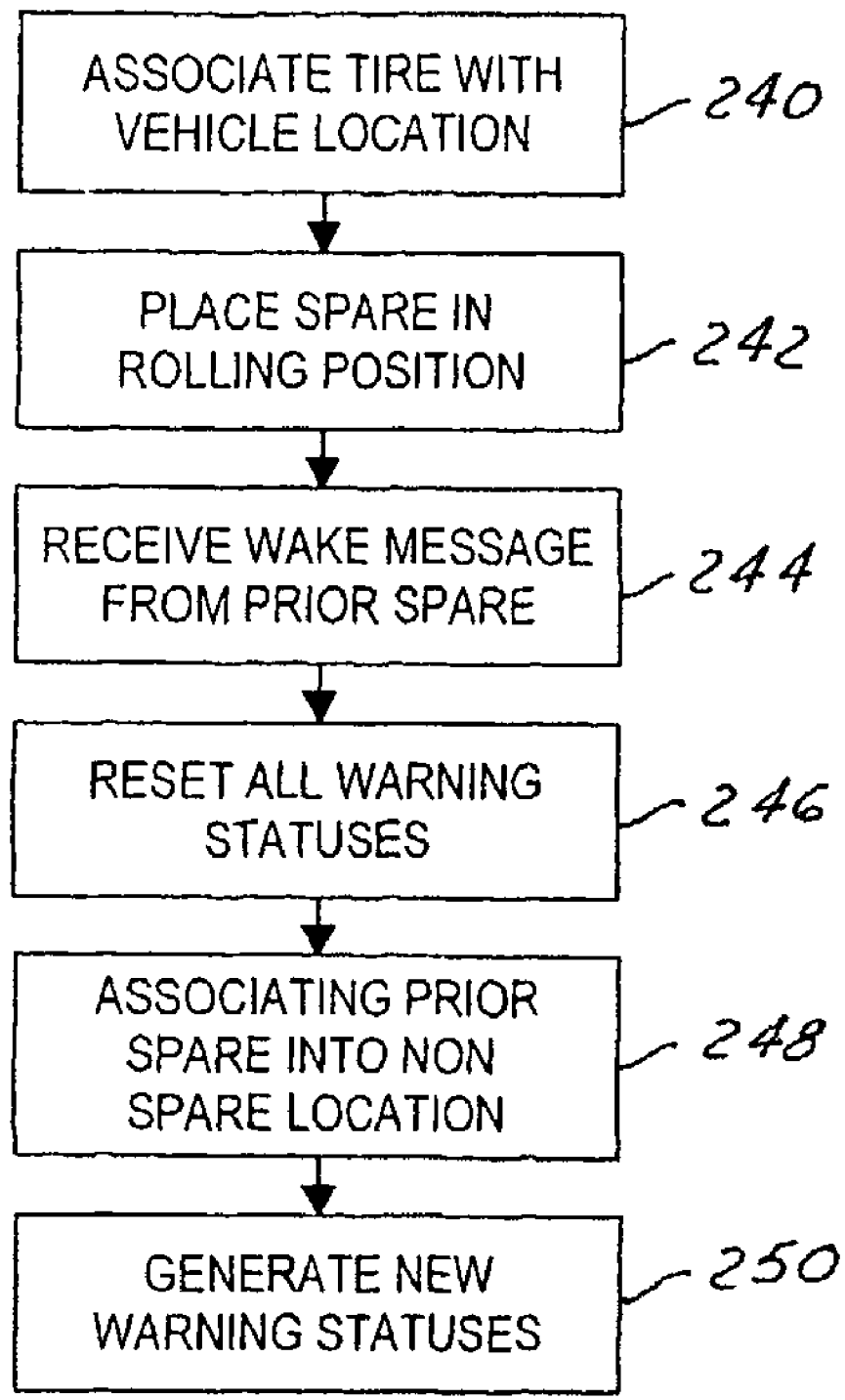
FIG. 15 is a flowchart of the operation of the system when a spare tire is placed into the rolling position.

Referring now to FIG. 15, the present invention preferably automatically updates the warning statuses of the system in response to increased tire pressure that indicates replacement of one of the tires with the spare tire. In step 240 each tire is associated with a rolling location in the vehicle. The spare tire is associated with the spare tire location. Various methods for associating as described above may be used. In step 242 the vehicle operator places the spare tire into a rolling position. Preferably, the spare tire is placed in the rolling tire position with a low tire pressure. However, the present invention does not rely upon proper placement. In step 244 the prior spare tire is awakened when rolling movement is provided. The system recognizes that this tire was a previous spare tire and thus now places the spare tire identification into the memory. Thus, the previously spare tire is now associated with a rolling location. When the previously spare tire is associated with a rolling location the warning statuses in the warning status memory are reset in step 246. In step 248 the previous spare may be associated into the non-rolling location in the memory after the warning status is generated or in step 244 as mentioned above. In step 250 new warning statuses are generated for the rolling locations that include the previous spare tire.

The resetting of the warning statuses in step 246 may include resetting the display on which each of the warning statuses are displayed.

Figure 16:
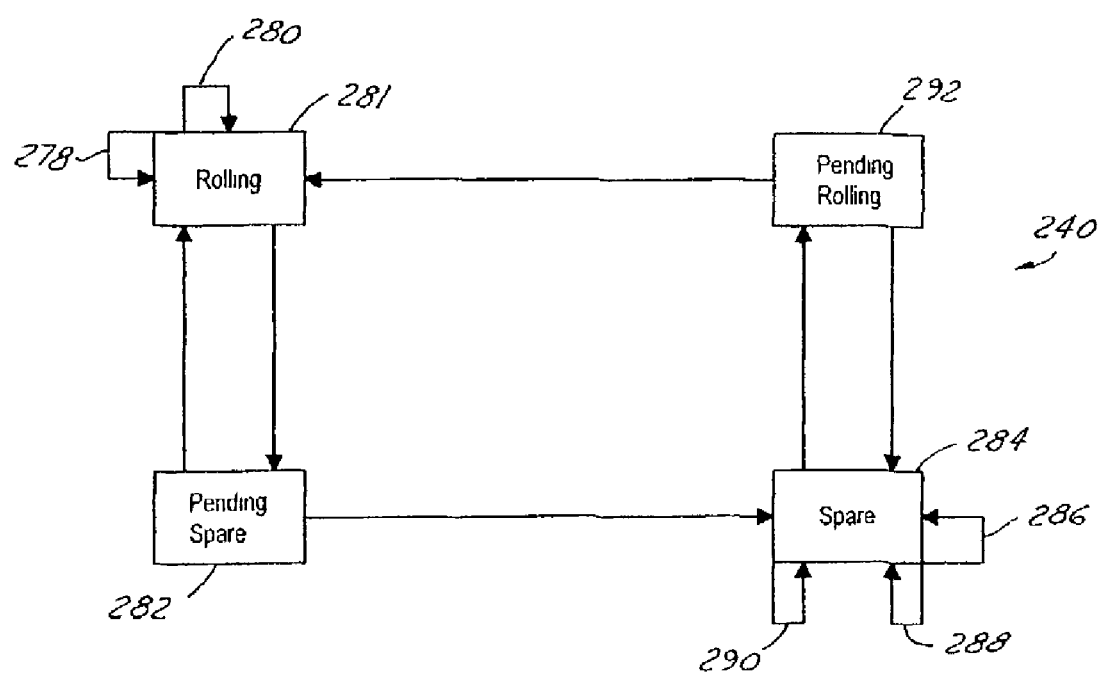
FIG. 16 is a state diagram of the spare tire identification according to the present invention.
Figure 17:
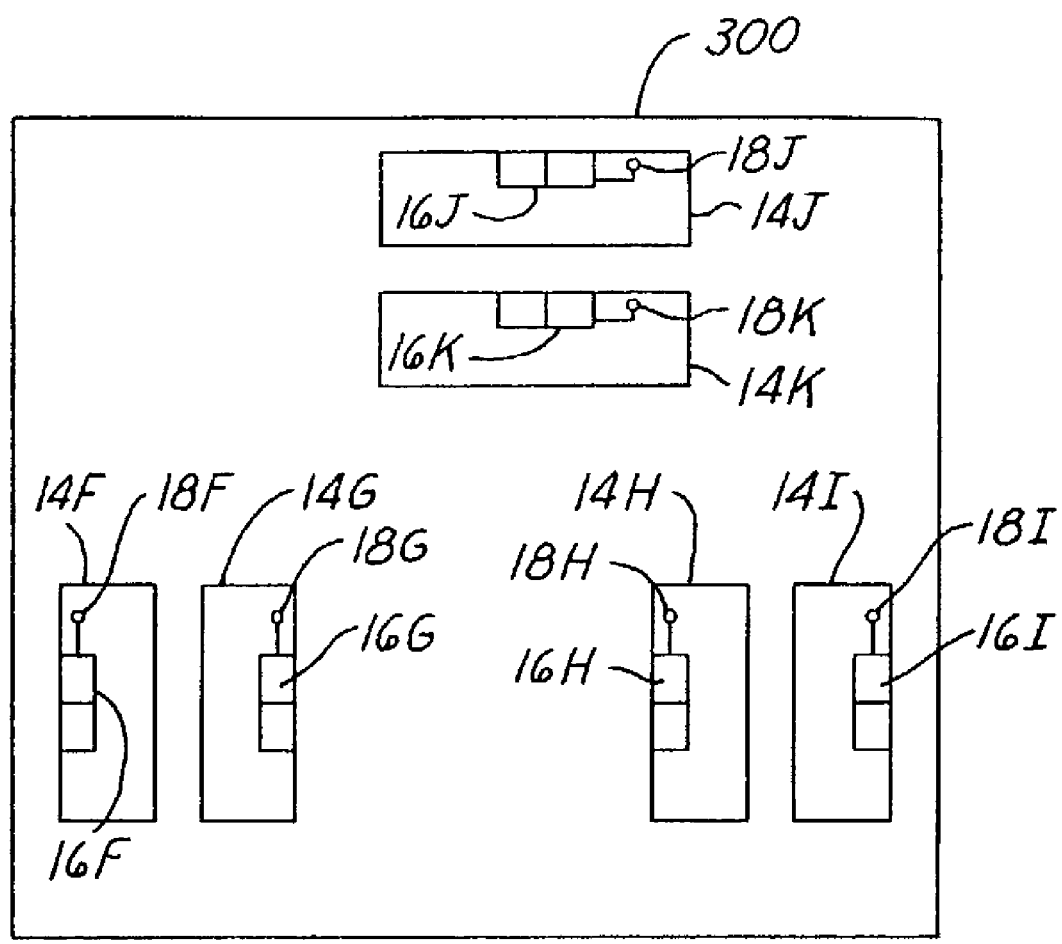
FIG. 17 is a block diagrammatic view of a trailer having pressure circuits according to the present invention.

Referring now to FIG. 16, step 240 is illustrated in more detail. The system starts in block 281 when a message expected from a tire is missed by the control system. The missed message may, for example, be from a fourth tire in a four tire system that has been replaced with another tire such as a spare. The missed message initiates a timer represented by arrow 278. If a message is received before a predetermined time, and the tire is a rolling tire and the timer is stopped as represented by arrow 280. When the timer expires and the vehicle speed is indicative of the vehicle moving in block 281, the tire status is set to a pending spare as represented by block 282. If the vehicle stops moving the tire status is again set to rolling.

Referring back to block 282, when the status is a pending spare status and any of the other tires have a pending rolling status block 284 is executed in which the tire status is set as a spare status. When the tire status is set to spare and a pressure message is received and the vehicle is moving, a counter is initiated and a timer is started as illustrated by arrow 286. If the timer expires, the count is set to zero as represented by arrow 288 and the spare tire status is maintained. Likewise, if the vehicle is not moving the counter is reset to zero and the timer is stopped as represented by arrow 290. In this manner the spare tire status is maintained. If the counter counts to a predetermined count indicative of a number of messages received, the tire status is set to pending rolling and the count is reset to zero as represented by block 292. In block 292 if the vehicle stops moving the tire status is once again returned to spare status and the functions described above with respect to block 284 are executed. In block 292, if any of the other tire statuses is a pending spare status, then the tire status is rolling and the system returns to block 281.

From the above, it is evident that the vehicle speed sensor and a timer are used to distinguish the various statuses of the vehicle. Thus, when an expected transmission is missed, the system recognizes the spare tire and stores the spare tire identification within the system along with the status. Thereafter, the spare tire becomes recognized as one of the rolling tires and thus the system operates receiving normal updates from each of the tires at the rolling positions. As can be seen at least one tire must be in a pending rolling status and one in a pending spare status for the system to change the status. This indicates the movement of one tire. Also, this system presumes that the identification of the spare is known.

The tire pressure monitoring system 12 of the present invention is preferably suitable for use with auxiliary tires in auxiliary locations. The auxiliary tires may, for example be positioned on a trailer 300. Trailer 300 is illustrated having a plurality of auxiliary positions including trailer tires 14F, 14G, 14H, and 14I. The trailer may also carry spare tires in auxiliary locations such as tire 14J and 14K. Each of the auxiliary tires includes a respective transmitter 16F–16J and a transmitting antenna 18F–18J. The vehicle itself may also have an auxiliary location such as on top of the roof, underneath the vehicle, or attached to the rear bumper. The present invention senses the presence of an auxiliary tire associated with the vehicle and programs the auxiliary transmitter's identification into the warning status memory. Each of the vehicle transmitters 16F–16J has an associated transmitter identification. The transmitter identifications are programmed into the system so that little chance of erroneous entry is provided.

Figure 18:
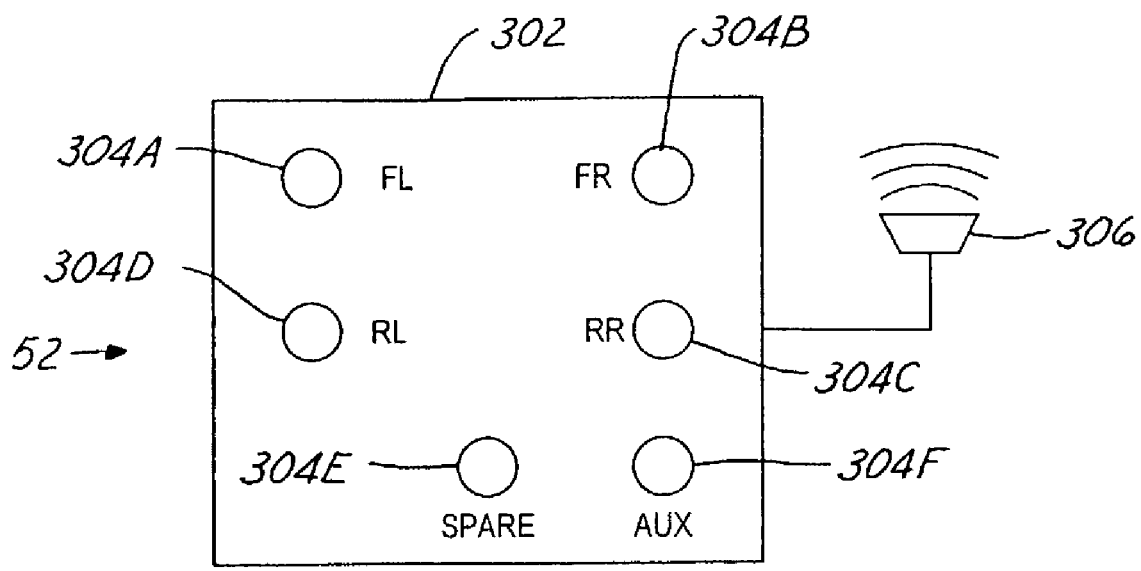
FIG. 18 is an elevational view of a display according to the present invention.

Referring now to FIG. 18, indicator 52 is illustrated as an LED display 302. LED display 302 has LEDs 304A, 304B, 304C, and 304D corresponding to rolling locations of the vehicle. In addition, an LED 304E corresponding to the position of the spare tire location is shown. In addition, an auxiliary LED 304F is shown. LED 304F corresponds to one or many of the auxiliary locations possible. Of course, those skilled in the art will recognize that several auxiliary LEDs may be incorporated into display 302. An audible indicator 306 may also be incorporated into display 302. Various other forms of display such as a liquid crystal display, navigation system display, or other types of displays may be incorporated into the system.

Figure 19:
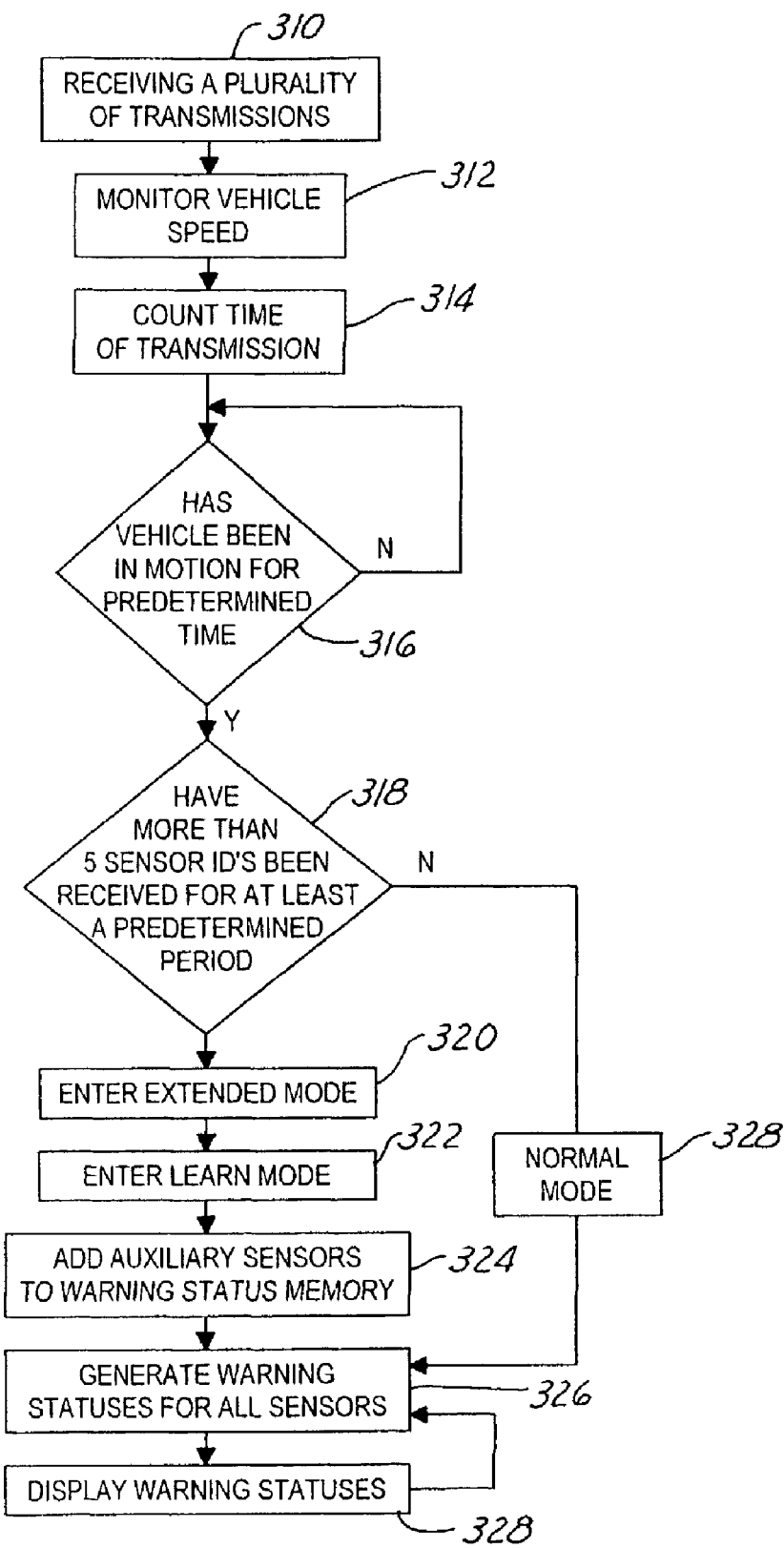
FIG. 19 is a flow chart of a method of automatically updating the tire pressure monitoring system in the presence of additional tires.

Referring now to FIG. 19, a method according to the present invention is shown. In step 310 a plurality of transmissions is received from the transmitters around the vehicle. These transmitters may include transmitters that have not yet been programmed into the vehicle warning status memory. It should be noted that the auxiliary sensors as well as other transmissions from adjacent vehicle transmitters may also be received. In step 314, the amount of time of a transmission is also monitored. The amount of time may, for example be the cumulative time or the cumulative time over a monitored period. In step 316 when the vehicle has been in motion for a predetermined amount of time as measured by steps 312 and 314, step 318 is executed. In step 318 if more than five sensors have been received for at least a predetermined amount of time, step 320 is executed. Step 318 used five sensors to indicate four rolling sensors and one spare tire sensor. However, the number five is used to signify the normal amount of tires typically associated with a vehicle. This number may be increased when vehicles have multiple tires in various locations. In step 320 an extended mode is entered to indicate that more than the normal amount of tires are associated with the vehicle. The pressure transmitter identifications have been transmitted for a predetermined amount of time while the vehicle has been moving and thus these transmitters are most likely associated with the vehicle rather than a nearby vehicle.

In step 322 a learn mode is entered. In step 324 the auxiliary transmitter identifications are added to the warning status memory. Thus, the rolling tires, the spare tires, and any auxiliary tire transmitter identification numbers are now associated with the warning status memory. In step 326 warning statuses for all the sensors may be generated as described above. Preferably, a warning status is provided when a tire is over pressure, under pressure, or flat. Referring back to step 318, when no more than the normal number of transmitter identifications is received, a normal mode is entered in step 328 to indicate to the system that no further identifications need to be programmed into the system. In step 328 the display is used to display the various warning statuses for each of the tire locations.

It should be noted that adding auxiliary tires to the system requires a tire transmitter to be added to the valve stem of any additional auxiliary tires if one is not present. This addition is relatively easy. The system may automatically switch from normal mode to extended mode as described above. However, step 318 may be replaced by detection that a trailer has been electrically connected to a trailer socket. The buttons 50 above may be used to program in various pressure thresholds in the case that the auxiliary tires have different pressure thresholds for the flat tire, low tire, and high pressure settings.

Figure 20:
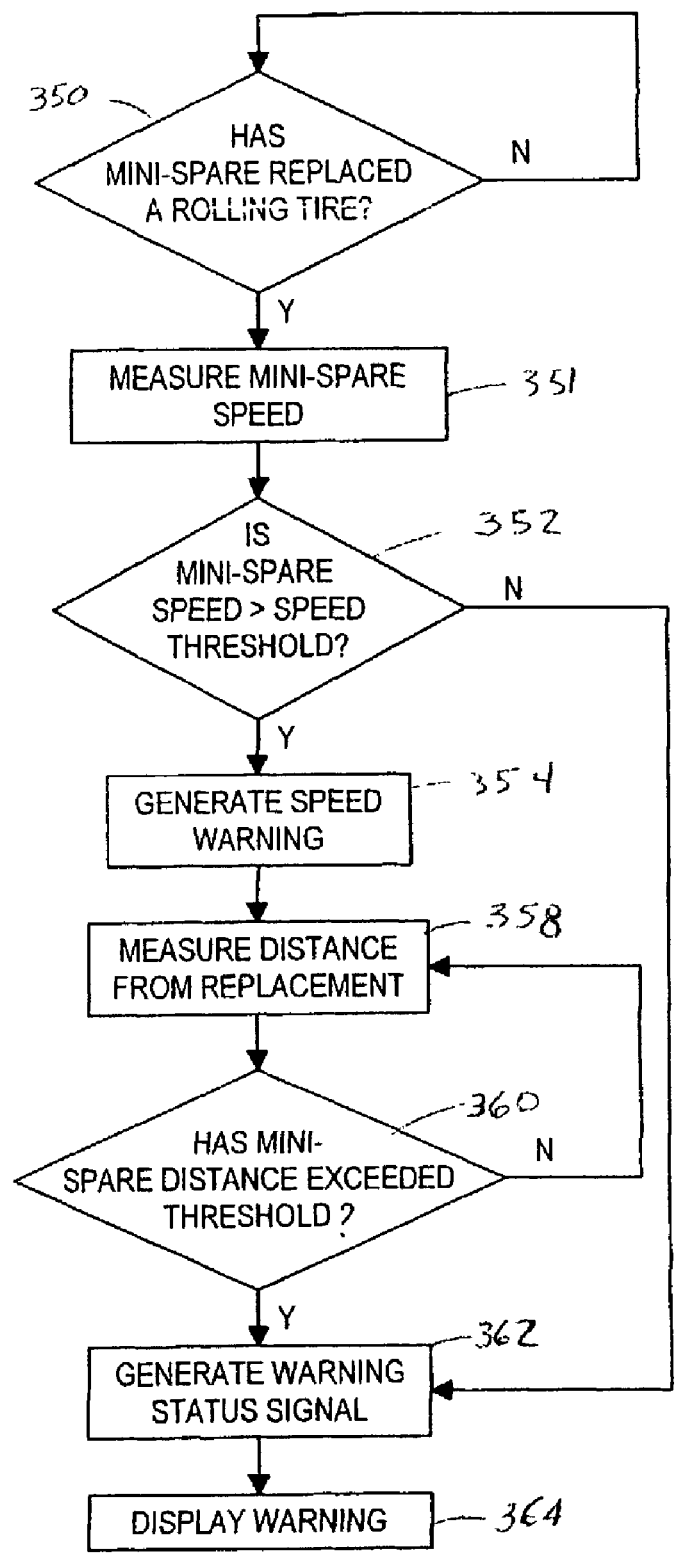
FIG. 20 is a flow chart of a method for indicating the end of the recommended travel distance of a mini-spare tire.

Referring now to FIG. 20, a system for warning of use of a mini-spare is started in step 350. In step 350 it is determined whether the mini-spare has replaced a rolling tire. If the mini-spare has not replaced the rolling tire then step 350 is repeated. The presence of the mini-spare is preferably determined automatically such as in the manner described above. Also, the operator of the vehicle may push a button or otherwise manually enter the presence of the mini-spare into the system. For automatic programming, the spare tire may provide a special data signal indicating that the tire is a mini-spare rather than a regular spare tire.

In step 351 the speed of the mini-spare is determined. The speed of the mini-spare may be determined as a function of the vehicle speed. That is, the vehicle speed may correspond exactly to the speed of the mini-spare. In step 352 the mini-spare speed is compared to a mini-spare speed threshold. The mini-spare speed threshold is typically provided by the manufacturer of the mini-spare. Oftentimes the speed threshold is about 55 miles per hour. The mini-spare speed threshold may be programmed at the factory during assembly of the vehicle or may be manually entered into the system. In step 352, if the mini-spare speed threshold has been exceeded a warning signal is generated in step 354. The warning signal may, for example, be an audible signal or a visual signal. The audible signal may be provided through a warning buzzer or chime. The visual signal may provide a display or LED display.

Referring back to step 350, the distance may also be determined simultaneously with the speed of step 351–354. In step 358, the distance from replacement is measured as the vehicle travels. The distance measured may be activated by the replacement of the spare. That is, the distance may start to be measured when the system receives the mini-spare identification signal. Of course, in a manual system the distance may be determined from the time of manually entering the presence of a mini-spare into the system. The system may also keep track of the cumulative distance traveled if the spare has been used intermittently.

The system may also activate the timer noted above. By determining a time signal from the time of reset and measuring the vehicle speed at various times, the distance traveled may be generated according to the formula $$D_i = \sum_{n=1}^{i} V_i * \Delta T_{i-1}^n$$

where $D_i$ is the distance traveled from the time the mini-spare is started to be used until the ith measurement of vehicle speed, $V_i$ is the ith measurement of vehicle speed, and $\Delta T_{i-1}$' is the amount of time between the ith and (i−1)th measurement of vehicle speed. The distance traveled may also be obtained from odometer readings placed on the communication bus of the vehicle.

When in step 360 the mini-spare distance threshold is not exceeded, step 358 is repeated. When the mini-spare threshold is exceeded a distance warning signal is generated in step 362. The distance warning signal may also be stored in the warning status memory.

In step 364 a distance and speed warning is displayed in response to the distance and speed warning signal. The display may be displayed in a variety of manners set forth above such as on an LCD display, a navigation display, an LED display, warning chimes, or the like.

It should be noted that the mini-spare takes the place of spare tire 14e set forth in FIG. 1. In addition, the spare tire may also include a pressure sensing circuit such as that used in a typical rolling tire or a regular spare. The mini-spare is a lighter and more compact version of the regular spare tire.

Figure 21:
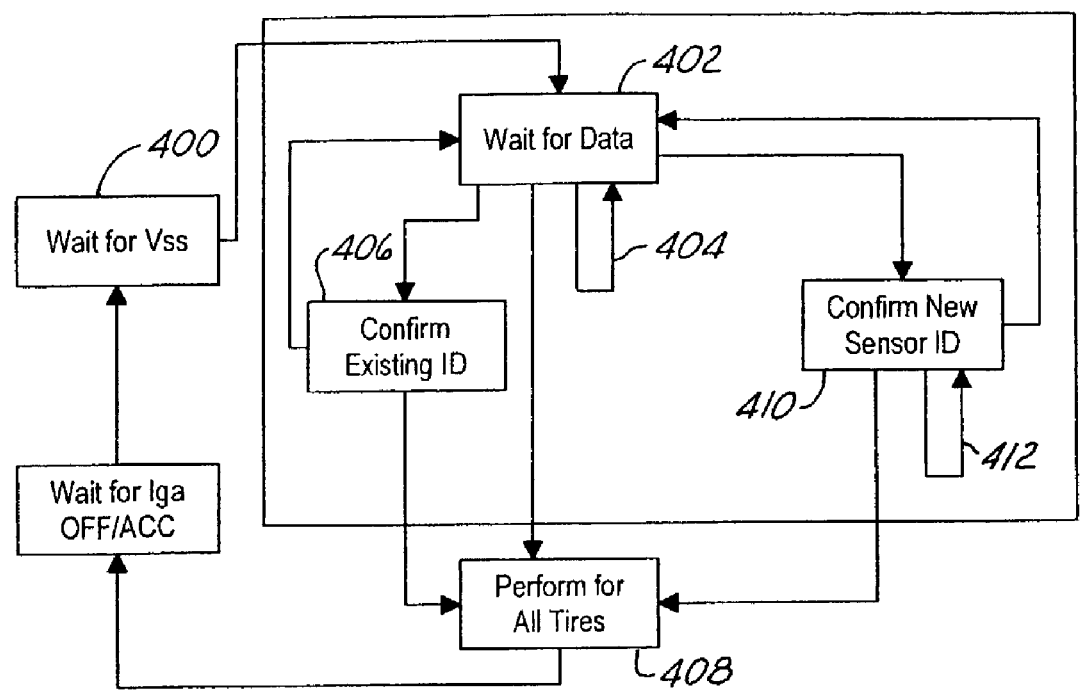
FIG. 21 a flowchart of the tire location method according to the present invention is shown.

Referring now to FIG. 21, a method for automatically determining the location of each of the tires in the vehicle is illustrated in a state diagrammatic form. In block 400 the vehicle speed is measured and the ignition status is also monitored. When the ignition status is in a run state and the vehicle speed is greater than a predetermined speed such as 20 miles per hour, a low frequency initiator is activated and a counter is set to one and a timer is started. In block 402, a signal from the pressure sensor is expected and thus the system waits for data therefrom. Arrow 404 represents that the three second timer has expired before the signal was received. In this situation the counter is incremented and the low frequency initiator is again activated along with the reactivation of the three second timer. In block 402 when the identification signal from the pressure sensor is the same as one of the identifiers already stored in the status memory, and the sensor status in the sensor signal indicates an initial status, block 406 is executed. The initial status is generated in response to the low frequency initiator. That is, normal operating conditions such as reporting pressures do not include the initial status indication. In block 406 the existing identification is confirmed by reactivating the low frequency initiator. When another sensor identification signal not matching the previous signal is received and the status of that signal is also an initial status, the count is incremented and a three second timer is started. The status of the low frequency initiator is reset to null and step 402 is again executed. The transition from block 406 to block 402 indicates the system is confused because two conflicting sensor identifications were received. Upon conflict the system is restarted in block 402. In block 406, when no different sensor identification signals are received the low frequency initiator status is existing and the system continues in block 408 described below.

Referring back to block 402, when the sensor identification signal is previously unstored in the memory and the sensor status is an initial status, block 410 is executed. In block 410 the low frequency initiator is again activated to confirm the newly-received sensor identification. When another sensor identification other than the newly-received sensor identification is received that has an initial status or the three second timer expires and the initiator status is still trying to confirm or the three second timer is running, the sensor status is an initial status and the sensor identification is an existing identification and the low frequency initiator status is still trying to confirm, then the count is incremented and the three second timer is started, the low frequency initiator status is reset to null and the low frequency initiator is again activated before the system returns to block 402. In block 410 when the three second timer expires and the low frequency status is "pending new", then the initiator status is set to confirm, the low frequency initiator is activated and a three second timer is started while setting the sensor identification to null as represented by arrow 312.

In block 410 when the three second timer is running the sensor status is in initial state and the sensor identification is confirmed, block 408 is executed as will be described below.

Referring back to block 402, when the count is greater than a predetermined count such as five, a pending fault is indicated and the system returns to block 408 in which the above steps 402 through 412 are again performed for each of the plurality of tire locations. In block 408 the statuses of each of the tire locations are held in memory when the ignition is in a run state. When the ignition indicates off or an "accessory" position in block 414, the system returns to block 400.

It should be noted that each of the tire position locations are determined either sequentially or simultaneously to determine the positions relative to the vehicle thereof.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a tire pressure monitoring system for a vehicle having a plurality of tire locations and a memory comprising:
   activating a first initiator signal from a first initiator at a first tire location of the plurality of tire locations;
   generating a first sensor signal in response to the first initiator signal, said first sensor signal compositely having a first sensor identification and an initiate status;
   receiving the first sensor signal;
   confirming the first sensor signal;
   storing the first sensor identification in the memory associated with the first tire location of the plurality of tire locations when the first sensor identification is not in the memory; and
   repeating the steps of activating, generating, receiving, confirming and storing for each of the plurality of tire locations.

2. A method as recited in claim 1 wherein prior to activating, generating a speed signal and activating when the speed signal is greater than a predetermined speed.

3. A method as recited in claim 1 wherein prior to activating, generating an ignition signal and activating when the ignition signal indicates a run status.

4. A method as recited in claim 1 after activating, initiating a timer, when the timer expires before receiving a first sensor signal, activating a fault indicator.

5. A method as recited in claim 1 further comprising generating a count corresponding to the number of times activating is performed without receiving the first sensor signal, generating a fault when the count exceeds a predetermined count.

6. A method as recited in claim 1 wherein the first tire location comprises a spare tire location.

7. A method of operating a tire pressure monitoring system having a memory comprising:
   activating a first initiator at a first predetermined location;
   receiving a first sensor signal, said first sensor signal compositely having a first tire identification and an initial status;
   when the first sensor signal is indicative of the initial status and the tire identification is not existing in the memory, confirming the first sensor signal and storing the tire identification in a memory associated with a location;
   when the first sensor signal is indicative of the initial status and the tire identification is existing in the memory, confirming the first sensor signal;
   when the first sensor status is unconfirmed, performing the steps of activating, receiving and confirming.

8. A method as recited in claim 7 after activating, initiating a timer, when the timer expires before receiving the first sensor signal, activating a fault indicator.

9. A method as recited in claim 7 wherein prior to activating, generating a speed signal and activating when the speed signal is greater than a predetermined speed.

10. A method as recited in claim 7 wherein prior to activating, generating an ignition signal and activating when the ignition signal indicates a run status.

11. A method as recited in claim 7 further comprising generating a count corresponding to the number of times activating is performed without receiving the first sensor signal, generating a fault when the count exceeds a predetermined count.

12. A tire pressure monitoring system for a vehicle comprising:
   a memory;
   a plurality of initiators fixedly attached to the vehicle at a respective plurality of locations;
   a plurality of tires having a respective plurality of tire transmitters generating a respective plurality of transmitter identification signals; and
   a controller coupled to the plurality of initiators, said controller activating said plurality of initiators, receiving a plurality of respective sensor signals, said plurality of sensor signals compositely having respective tire identifications and an initial status, when the plurality of respective sensor signals is indicative of the initial status and the respective plurality of tire identification signals is not existing in the memory, confirming the plurality of sensor signals and storing the confirmed signals in the memory, when the plurality of respective sensor signals is indicative of the initial status and the plurality of respective tire identification signals is existing in the memory, confirming the first sensor signal, when the plurality of sensor statuses is unconfirmed, performing the steps of activating, receiving and confirming.

13. A system as recited in claim 12 further comprising a counter counting a number of activations, wherein said controller performing the steps of activating, receiving and confirming when the counter is below a predetermined count.

14. A system as recited in claim 13 when the counter reaches a predetermined count said controller generating a fault signal.

15. A system as recited in claim 12 wherein said controller activates said plurality of initiators sequentially.

16. A system as recited in claim 12 further comprising a vehicle speed sensor generating a vehicle speed signal, said controller activating said plurality of initiators when the vehicle speed signal is greater than a predetermined speed.

17. A system as recited in claim 12 further comprising an ignition sensor generating a run signal and an off signal, said controller activating said plurality of initiators when the ignition sensor generates a run signal.

* * * * *